United States Patent
Ranjan

(10) Patent No.: US 12,242,509 B2
(45) Date of Patent: Mar. 4, 2025

(54) DYNAMIC PAIRING MECHANISM FOR LIVE DATABASE REPLICATION

(71) Applicant: salesforce.com, inc., San Francisco, CA (US)

(72) Inventor: Jyoti Ranjan, Hyderabad (IN)

(73) Assignee: Salesforce, Inc., San Francisco, CA (US)

(*) Notice: Subject to any disclaimer, the term of this patent is extended or adjusted under 35 U.S.C. 154(b) by 318 days.

(21) Appl. No.: 17/579,161

(22) Filed: Jan. 19, 2022

(65) Prior Publication Data

US 2023/0229670 A1   Jul. 20, 2023

(51) Int. Cl.
  G06F 16/27    (2019.01)
  G06F 11/20    (2006.01)
  G06F 16/182   (2019.01)
  G06F 16/23    (2019.01)

(52) U.S. Cl.
  CPC ........ G06F 16/273 (2019.01); G06F 11/2069 (2013.01); G06F 16/1844 (2019.01); G06F 16/2379 (2019.01); G06F 16/275 (2019.01); G06F 2209/542 (2013.01)

(58) Field of Classification Search
  CPC .. G06F 16/27; G06F 16/2358; G06F 16/2365; G06F 16/2379; G06F 16/273; G06F 11/1474; G06F 16/275; G06F 11/1446; G06F 11/2069; G06F 2209/542
  See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 5,983,227 A | 11/1999 | Nazem et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,133 B1 | 4/2001 | Masthoff |

(Continued)

*Primary Examiner* — Marcin R Filipczyk

(57) ABSTRACT

Techniques are provided for copying data from a source database to a target database in a database replication system which includes a database event mining system, an event interceptor process and an event receptor process. In one aspect, the event interceptor detects a failure in the event receptor and switches to a mode in which it rejects new database events from the database event mining system. The event interceptor can also request that the database event mining system resend the event after a specified delay. The event interceptor can also shut itself down for a specified period of time, then restart and listen for a pairing request from the event receptor. In another aspect, the event receptor can request that the database event mining system send event data from a specified system change number.

18 Claims, 10 Drawing Sheets

(56) References Cited

U.S. PATENT DOCUMENTS

| | | |
|---|---|---|
| 6,216,135 B1 | 4/2001 | Brodersen et al. |
| 6,233,617 B1 | 5/2001 | Rothwein et al. |
| 6,236,978 B1 | 5/2001 | Tuzhilin |
| 6,266,669 B1 | 7/2001 | Brodersen et al. |
| 6,288,717 B1 | 9/2001 | Dunkle |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,411,949 B1 | 6/2002 | Schaffer |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec et al. |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,907,566 B1 | 6/2005 | McElfresh et al. |
| 7,062,502 B1 | 6/2006 | Kesler |
| 7,069,231 B1 | 6/2006 | Cinarkaya |
| 7,069,497 B1 | 6/2006 | Desai |
| 7,100,111 B2 | 8/2006 | McElfresh et al. |
| 7,181,758 B1 | 2/2007 | Chan |
| 7,269,590 B2 | 9/2007 | Hull et al. |
| 7,289,976 B2 | 10/2007 | Kihneman et al. |
| 7,340,411 B2 | 3/2008 | Cook |
| 7,356,482 B2 | 4/2008 | Frankland et al. |
| 7,373,599 B2 | 5/2008 | McElfresh et al. |
| 7,401,094 B1 | 7/2008 | Kesler |
| 7,406,501 B2 | 7/2008 | Szeto et al. |
| 7,412,455 B2 | 8/2008 | Dillon |
| 7,454,509 B2 | 11/2008 | Boulter et al. |
| 7,508,789 B2 | 3/2009 | Chan |
| 7,599,935 B2 | 10/2009 | La Rotonda et al. |
| 7,603,331 B2 | 10/2009 | Tuzhilin et al. |
| 7,603,483 B2 | 10/2009 | Psounis et al. |
| 7,620,655 B2 | 11/2009 | Larsson et al. |
| 7,644,122 B2 | 1/2010 | Weyer et al. |
| 7,668,861 B2 | 2/2010 | Steven |
| 7,698,160 B2 | 4/2010 | Beaven et al. |
| 7,730,478 B2 | 6/2010 | Weissman |
| 7,747,648 B1 | 6/2010 | Kraft et al. |
| 7,779,039 B2 | 8/2010 | Weissman et al. |
| 7,779,475 B2 | 8/2010 | Jakobson et al. |
| 7,827,208 B2 | 11/2010 | Bosworth et al. |
| 7,853,881 B1 | 12/2010 | Aly Assal et al. |
| 7,945,653 B2 | 5/2011 | Zukerberg et al. |
| 8,005,896 B2 | 8/2011 | Cheah |
| 8,014,943 B2 | 9/2011 | Jakobson |
| 8,015,495 B2 | 9/2011 | Achacoso et al. |
| 8,032,297 B2 | 10/2011 | Jakobson |
| 8,073,850 B1 | 12/2011 | Hubbard et al. |
| 8,082,301 B2 | 12/2011 | Ahlgren et al. |
| 8,095,413 B1 | 1/2012 | Beaven |
| 8,095,531 B2 | 1/2012 | Weissman et al. |
| 8,095,594 B2 | 1/2012 | Beaven et al. |
| 8,103,611 B2 | 1/2012 | Tuzhilin et al. |
| 8,150,913 B2 | 4/2012 | Cheah |
| 8,209,308 B2 | 6/2012 | Rueben et al. |
| 8,209,333 B2 | 6/2012 | Hubbard et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 10,216,820 B1* | 2/2019 | Holenstein .......... G06F 16/1865 |
| 11,748,212 B1* | 9/2023 | Holenstein .......... G06F 11/1448 714/19 |
| 2001/0044791 A1 | 11/2001 | Richter et al. |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2008/0249972 A1 | 10/2008 | Dillon |
| 2009/0059788 A1* | 3/2009 | Granovsky ....... H04W 28/0273 370/235 |
| 2009/0063415 A1 | 3/2009 | Chatfield et al. |
| 2009/0100342 A1 | 4/2009 | Jakobson |

(56) References Cited

U.S. PATENT DOCUMENTS

| | | |
|---|---|---|
| 2009/0177744 A1 | 7/2009 | Marlow et al. |
| 2011/0218958 A1 | 9/2011 | Warshavsky |
| 2011/0247051 A1 | 10/2011 | Bulumulla |
| 2012/0042218 A1 | 2/2012 | Cinarkaya |
| 2012/0233137 A1 | 9/2012 | Jakobson et al. |
| 2012/0290407 A1 | 11/2012 | Hubbard et al. |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya |
| 2014/0359537 A1 | 12/2014 | Jackobson et al. |
| 2018/0176307 A1* | 6/2018 | Kancherla ............ H04L 67/1004 |
| 2021/0182162 A1* | 6/2021 | Kohli .................. G06F 9/44505 |

* cited by examiner

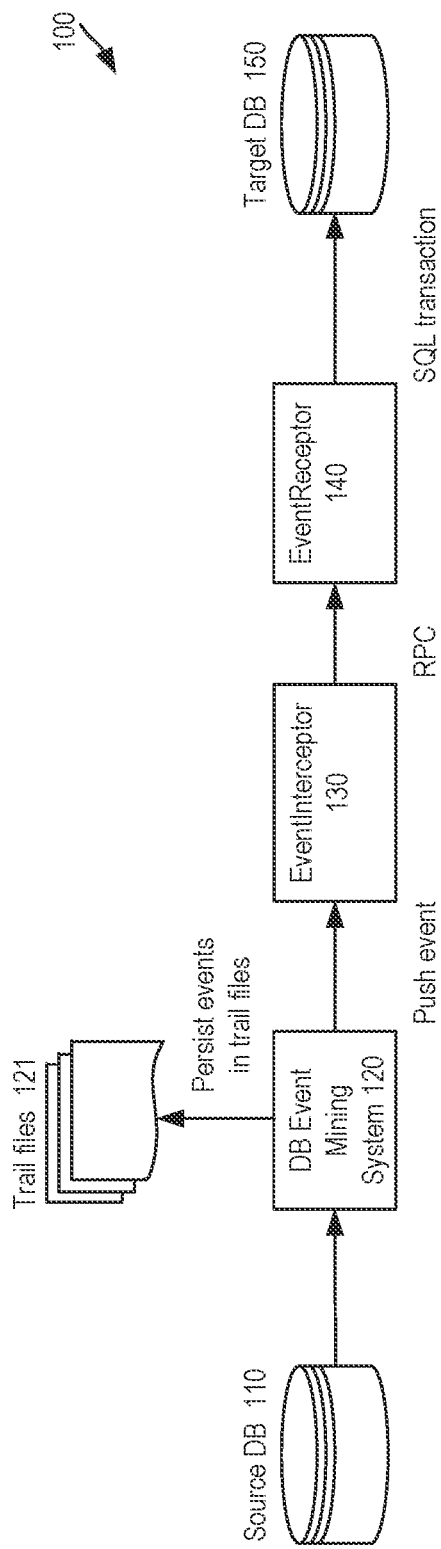

US 12,242,509 B2

DYNAMIC PAIRING MECHANISM FOR LIVE DATABASE REPLICATION

TECHNICAL FIELD

One or more implementations relate to the field of database technologies; and more specifically, to techniques for handling failure and other anomalous situations during a data transfer.

BACKGROUND ART

Database replication technologies are used for copying data from one database to another. For example, the databases can be in different physical locations to provide a backup in case of a database failure. Databases can also be distributed to provide faster access to their data. Typically, multiple components are involved in the copying process. For example, one component may detect when a change occurs to a source database. This component can generate a notification such as an event when a change is detected. Other components react to the notification by gathering the associated data and forwarding it to a target database. A record of the event can also be stored. However, various challenges are presented in handling failures and other anomalous situations during a data transfer.

BRIEF DESCRIPTION OF THE DRAWINGS

The following figures use like reference numbers to refer to like elements. Although the following figures depict various example implementations, alternative implementations are within the spirit and scope of the appended claims. In the drawings:

FIG. 1 is a block diagram illustrating a computing system for copying data between databases, according to some example implementations.

FIG. 2 is a table of failure scenarios for the EventInterceptor and EventReceptor processes of FIG. 1, according to some example implementations.

DETAILED DESCRIPTION

Figure 3:
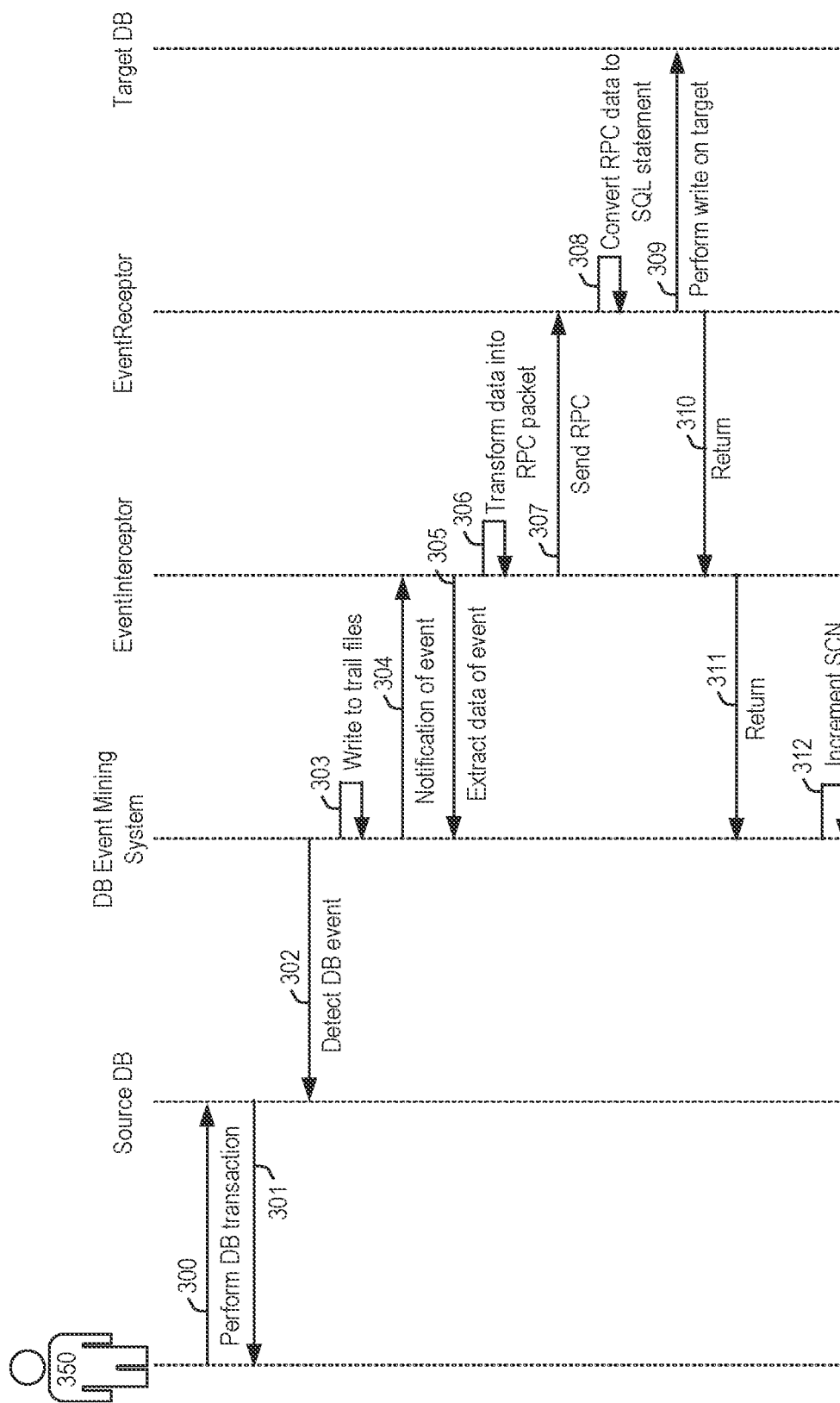
FIG. 3 is a sequence diagram showing the copying of data from the source database to the target database of FIG. 1, consistent with case 4 of FIG. 2, according to some example implementations.

The following description describes technologies for copying data from one database to another.

Various database replication products are available. In an example implementation, a database (DB) monitoring process monitors a source database and detects when there is a change to the database. When the change is detection, a transaction is initiated for copying the changed data to a target database. For example, an event can be triggered for the transaction, where the event is pushed to an upstream component such as an EventInterceptor process. In response, the EventInterceptor process extracts data of the event and forwards it to an EventReceptor process which is further upstream, in the direction of the target database. The EventReceptor process is responsible for writing the data to the target database.

However, various failure scenarios can occur. For example, the EventInterceptor process or the EventReceptor process can have an unplanned or planned shutdown. In another example, one of the processes is started before the other. These scenarios can result in challenges such as the EventInterceptor having to buffer data when the EventReceptor is unavailable, or the EventInterceptor and EventReceptor having to retain state information to keep track of the replication process. In another example, the EventReceptor process detects an error with previously-written data and thus needs to re-write the data of the event. This can result in resending an excessive amount of data.

The techniques disclosed herein address the above and other issues. In an example implementation, the EventInterceptor waits to receive a pairing request from the EventReceptor before the EventInterceptor begins processing events from a DB Event Mining System. When it is not yet paired, the EventInterceptor rejects events pushed to it from the DB Event Mining System and requests that the DB Event Mining System resend the event at a specified time. This process can be repeated until the EventInterceptor is paired with the EventReceptor. Once paired, the EventInterceptor processes the events and forwards the associated data to the EventReceptor for writing to the target database.

In another example implementation, after the two are paired, the EventInterceptor detects a failure in the EventReceptor such as by determining that an ongoing transaction has failed or by determining that no response has been received to a heartbeat check signal sent to the EventReceptor. At this time, the EventInterceptor sends a request to the DB Event Mining System to re-send the current database event and the EventInterceptor shuts itself down for a specified period of time before restarting. When it restarts, it waits for a pairing request from the EventReceptor which indicates the EventReceptor has recovered from its failure. When no pairing request is received, the EventInterceptor repeatedly rejects events pushed to it from the DB Event Mining System, as discussed previously. When a pairing request is received, the EventInterceptor starts to accept events pushed to it from the DB Event Mining System.

In another example implementation, the EventReceptor detects an error with previously-written data such as due to a post-scan comparison between the source and target data. In this case, the EventReceptor requests that the EventInterceptor replay the data from a given point in time, such as can be identified by a specified system change number (SCN) or other transaction identifier. The EventInterceptor responds by requesting that the DB Event Mining System start sending event data from the specified SCN. The resending can continue until a last transaction in a batch of transactions is sent, for example.

These and other advantages will be further apparent in view of the following discussion.

FIG. 1 is a block diagram illustrating a computing system 100 for copying data between databases, according to some example implementations. The system is an example of a database replication system. The system 100 includes a source database (DB) 110, a Database (DB) Monitoring process 120, an EventInterceptor 130, an EventReceptor 140 and a target database 150. The term "EventInterceptor" is the name of a Java Application Programming Interface (API). This interface provides an implementation that is capable of intercepting and processing Events. Generally, "EventInterceptor," "event interceptor," or the like can refer to any software interface, process or other construct which is capable of receiving data regarding an event.

The term "Event" is also the name of a Java API. An "Event" object in the Java standard captures the necessary information required to adequately describe some activity that has occurred. Events can fire before a change has been committed to memory (pre-committed) or after the change has been committed (post-commit). Semantically, EventInterceptors listening to pre-committed events will have the opportunity to change the state of the request before it has been committed. Generally, the term "event" can refer to any similar software interface, process or other construct. The term "EventReceptor" is the name of a Java function which can be used to receive any data that the EventReceptor 140 needs as parameters. Generally, "EventReceptor," "event receptor," or the like can refer to any software interface, process or other construct which is capable of receiving data regarding an event and writing the data to the target database 150.

The source database 110 and target database 150 can be of various types. For example, relational databases store data in multiple, related tables. Within the tables, data is stored in rows and columns. A relational database management system (RDBMS) is a program used to create, update, and administer a relational database. Structured Query Language (SQL) is the most common language for reading, creating, updating and deleting data. Examples include Microsoft SQL Server, Oracle Database, MySQL, PostgreSQL and IBM Db2.

NoSQL is a category that includes any database that does not use SQL as its primary data access language. These types of databases are also sometimes referred to as non-relational databases. This allows storage of unstructured or semi-structured data. Examples include Apache Cassandra, MongoDB, CouchDB, and CouchBase.

A cloud database refers to any database which runs in the cloud, e.g., on the Internet instead of at a local computer. Cloud databases offer flexibility and scalability, along with high availability. Examples include Microsoft Azure SQL Database, Amazon Relational Database Service, and Oracle Autonomous Database.

Columnar databases store data in columns rather than rows. These types of databases are often used in data warehouses because they are suited for handling analytical queries. Examples include Google BigQuery, Cassandra, HBase, MariaDB, Azure SQL Data Warehouse In wide column databases, data is stored in column families, rather than in rows and columns. These are suited for supporting real-time big data applications. Examples include BigTable, Apache Cassandra and Scylla.

Object-oriented databases are based on object-oriented programming, where the data and its attributes are tied together as an object. Object-oriented databases are managed by object-oriented database management systems (OODBMS). These databases work well with object-oriented programming languages, such as C++ and Java. Examples include Wakanda and ObjectStore.

Key-value databases, a type of NoSQL database, save data as a group of key-value pairs made up of two data items each. These are suited for handling high volumes of traffic, such as for session management of web applications, user sessions for massive multi-player online games, and online shopping carts. Examples include Amazon DynamoDB and Redis.

Hierarchical databases use a parent-child model to store data. These are suited to support high-performance and high availability applications. Examples include IBM Information Management System (IMS) and Windows Registry.

Document databases use JavaScript Object Notation (JSON)-like documents to model data instead of rows and columns. These are suited to store and manage document-oriented information and are useful for mobile apps that need fast iterations. Examples include MongoDB, Amazon DocumentDB and Apache CouchDB.

Graph databases are a type of NoSQL database that are based on graph theory. These are suited to analyze the relationships between heterogeneous data points, such as in fraud prevention or for mining data about customers from social media. Examples include Datastax Enterprise Graph and Neo4J.

A time series database is a database optimized for time-stamped, or time series, data. Examples of this type of data include network data, sensor data, and application performance monitoring data. Internet of Things sensors output a constant stream of time series data. Examples include Druid, eXtremeDB and InfluxDB.

The source database 110 may store data for one or more users, for example, who access the database via respective computing devices. When data is changed in the source database 110, e.g., by adding, changing or deleting data, an event may be triggered by the DB Event Mining System 120. The DB Event Mining System 120 may monitor the source database 110 to detect the changes. One possible example of the DB Event Mining System 120 is the Oracle GoldenGate software. This software product allows one to replicate, filter, and transform data from one database to another database across an enterprise. The databases can be of the same type or of different types. Other examples of the DB Event Mining System 120 include Informatica PowerCenter, SQL Server Integration Services (SSIS), Denodo Platform, Fivetran, Alteryx Designer, AWS Glue, Pentaho Data Integration (PDI) and Qlik Replicate. Generally, the DB Event Mining System 120 can be any software interface, process, system or other construct which is capable of generating an event when there is a change to a database and communicating the event to an event interceptor process.

The DB Event Mining System 120 creates trail files 121, e.g., backup files. This can be a series of files on a non-volatile storage medium such as a disk drive, which the DB Event Mining System 120 uses to store the captured changes of the source database 110 to support the continuous extraction and replication of database changes. Each change may be associated with an event, such that each event is persisted in the trail files 121. The trail files 121 can store an identifier of the event such as a SCN and the changed data of the source database 110. The DB Event Mining System 120 pushes events to the EventInterceptor 130. The EventInterceptor 130 intercepts live database transaction events, extracts meta-data and data associated with the event, applies transformation logic to the data and transmits it to the EventReceptor 140 using a remote procedure protocol (RPC), for example. The EventInterceptor 130 is a process or software component which is responsible for interacting with the DB Event Mining System 120 and the EventReceptor 140.

An RPC is an inter-process communication technique that is used for client-server based applications. It is also known as a subroutine call or a function call. A client process has a request message that the RPC translates and sends to a server process. This request may be a procedure or a function call to a remote server. When the server receives the request, it sends the required response back to the client. The client is blocked while the server is processing the call and only resumes execution after the server is finished. In the context of the system of FIG. 1, the EventInterceptor 130 is the client and the EventReceptor 140 is the server. Examples of RPCs include Google RPC (gRPC), Microsoft RPC, JSON-RPC, GraphQL, REST, Apache Dubbo, and Mercury.

In particular, gRPC is an API framework that allows a program in one location on the Internet to pass data to a distinct function in another program at another location on the Internet for processing. While other API frameworks such as REST typically pass data from client to server and back again using text-based formats such as JSON or XML, under gRPC, data is passed between a client and a server-side target function in faster, binary format.

In one implementation, the EventReceptor 140 receives the data in the RPC, converts it into one or more SQL statements and writes the data to the target database 150 using the one or more SQL transactions. However, any technique for writing the data can be used. The target database 150 is therefore kept consistent with the source database 110. The EventReceptor 140 is a process or software component which is responsible for interacting with the target database 150 to write data.

Figure 7:
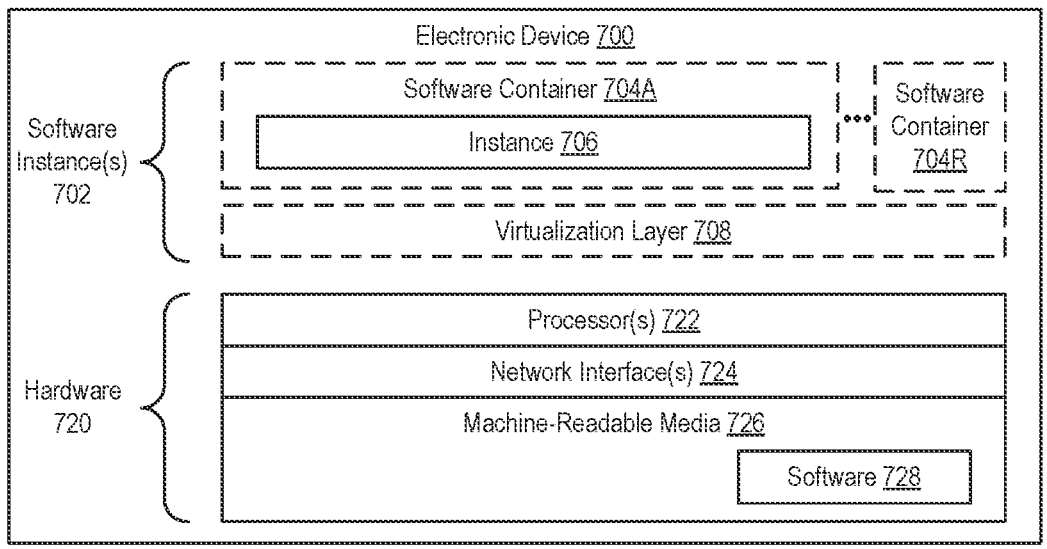
FIG. 7 is a block diagram illustrating an electronic device according to some example implementations.
Figure 8:
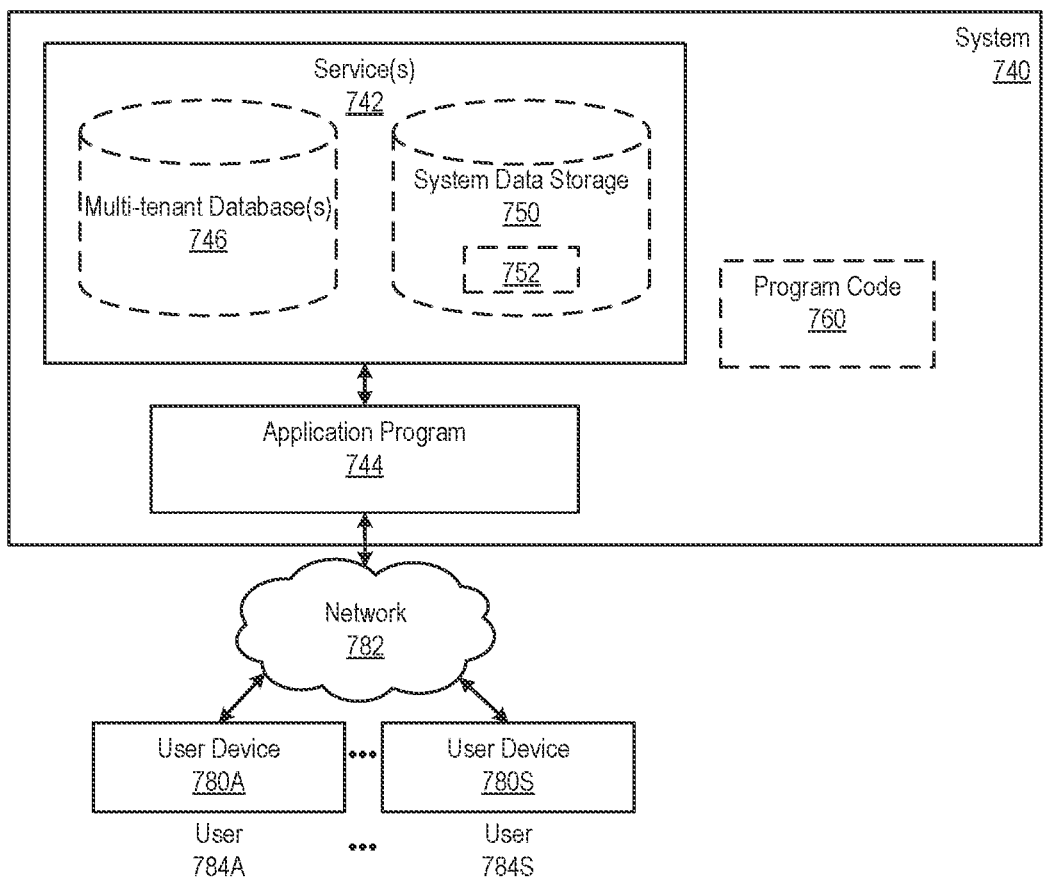
FIG. 8 is a block diagram of a deployment environment according to some example implementations.

In summary, the system 100 provides an intelligent replication workflow involving a chain of components which intercept database events, extract data and provides it to upstream components. The components of the system 100 can runs on one or more computing devices such as depicted in FIGS. 7 and 8.

FIG. 2 is a table of failure scenarios for the EventInterceptor 130 and EventReceptor 140 processes of FIG. 1, according to some example implementations. Four cases are depicted, where a 0 indicates the process is not working, e.g., offline or down, due to a failure or being shut down and a 1 indicates the process is working, e.g., online or up. In cases 1 and 2, no event is being sent to the EventInterceptor 130 or EventReceptor 140, so there is no issue from this perspective. In case 4, both processes are working normally, so again there is no issue. However, case 3, or a transition from case 2 to 3, presents a problem because the EventInterceptor 130 will receive events but will not be able to forward them to the EventReceptor 140. The EventReceptor 140 can go down for various reasons after the EventInterceptor 130 has sent information about an event to it. Additionally, the EventInterceptor 130 may continue to receive data from the DB Event Mining System 120 while the EventReceptor 140 is down. One approach is for the EventInterceptor 130 to buffer the data it receives from the DB Event Mining System 120 until the EventReceptor 140 comes back online. At that time, the EventInterceptor 130 can push a batch of requests to it.

This approach has a number of disadvantages. For example, first, the EventInterceptor 130 will require a buffer/cache to hold the data until the EventReceptor 140 comes back online. Second, this would result in a duplication of storage since the DB Event Mining System 120 is already storing the data in trail files 121. Third, a data consistency problem can occur when there is a failure in an ongoing or uncompleted transaction. For example, an RPC may be sent by the EventInterceptor 130 to the EventReceptor 140 which is not completed or acknowledged. These issues can be understood further in view of the following.

FIG. 3 is a sequence diagram showing the copying of data from the source database 110 to the target database 150 of FIG. 1, consistent with case 4 of FIG. 2, according to some example implementations. In this example, there is no failure. A sequence diagram provides a flow of events between components or processes, in a time order from top to bottom. The user 350 can be a person and/or a system program. An arrow 300 depicts a request of the user to perform a database (DB) transaction at the source database 110. An arrow 301 depicts a response to the user. When the transaction is performed, such as changing, adding or deleting data, a database event is detected by the DB Event Mining System 120 as depicted by the arrow 302. The DB Event Mining System 120 notices the change and detects the database event. The arrow 303 depicts the DB Event Mining System 120 writing event data to trail files 121. As mentioned, this is a series of files which the DB Event Mining System 120 uses to store the captured changes of the source database 110 to support the continuous extraction and replication of database changes.

The writing of the event data to the trail files 121 can be secured by security credentials. One example is Oracle Wallet Manager. The arrow 304 depicts a notification of the event being sent from the DB Event Mining System 120 to the EventInterceptor 130. This can be a callback, for example. In response, the arrow 305 depicts a request from the EventInterceptor 130 to the DB Event Mining System 120 to extract data of the event. For example, this data can be the changed data of the source database 110. An arrow 306 indicates the EventInterceptor 130 transforms the data into an RPC packet. One example is to transform the data into one or more gRPC packets. The arrow 307 depicts sending the data in the RPC packets to the EventReceptor 140. The arrow 308 depicts the EventReceptor 140 converting the data into one or more SQL statements. The arrow 309 depicts the EventReceptor 140 writing the data to the target database 150. The arrow 310 depicts a return confirmation signal from the EventReceptor 140 to the EventInterceptor 130, and the arrow 311 depicts a return confirmation signal from the EventInterceptor 130 to the DB Event Mining System 120. The arrow 312 depicts the SCN being incremented.

Note that each transaction or event can have an identifier such as a SCN, as mentioned. An SCN is similar to a serial number and is an example of a checkpoint. Each time data is committed in a database, the SCN is incremented. The SCN thus marks a consistent point in time in a database. The SCN can be used to track what has been processed and what has not been processed. The SCN can be used to go backward in time to access previously-committed data.

The above discussion involves a sequence where there is no failure. However, the presence of a failure results in various challenges. The techniques described herein provide a dynamic and intelligent SCN-based pairing mechanism between the EventInterceptor 130 and EventReceptor 140 to address failure scenarios. As mentioned, the failure of the EventReceptor 140 while a transaction is ongoing or the need of the EventInterceptor 130 to cache data until the EventReceptor 140 is back online requires an unorthodox way of managing the lifecycle of these two components. Instead, the techniques described herein enable the EventReceptor 140 to influence when the EventInterceptor 130 starts pushing events to it, and empower the EventReceptor 140 to tell the EventInterceptor 130 to go back in time to send events from the point where it failed to process a transaction.

Figure 5A:
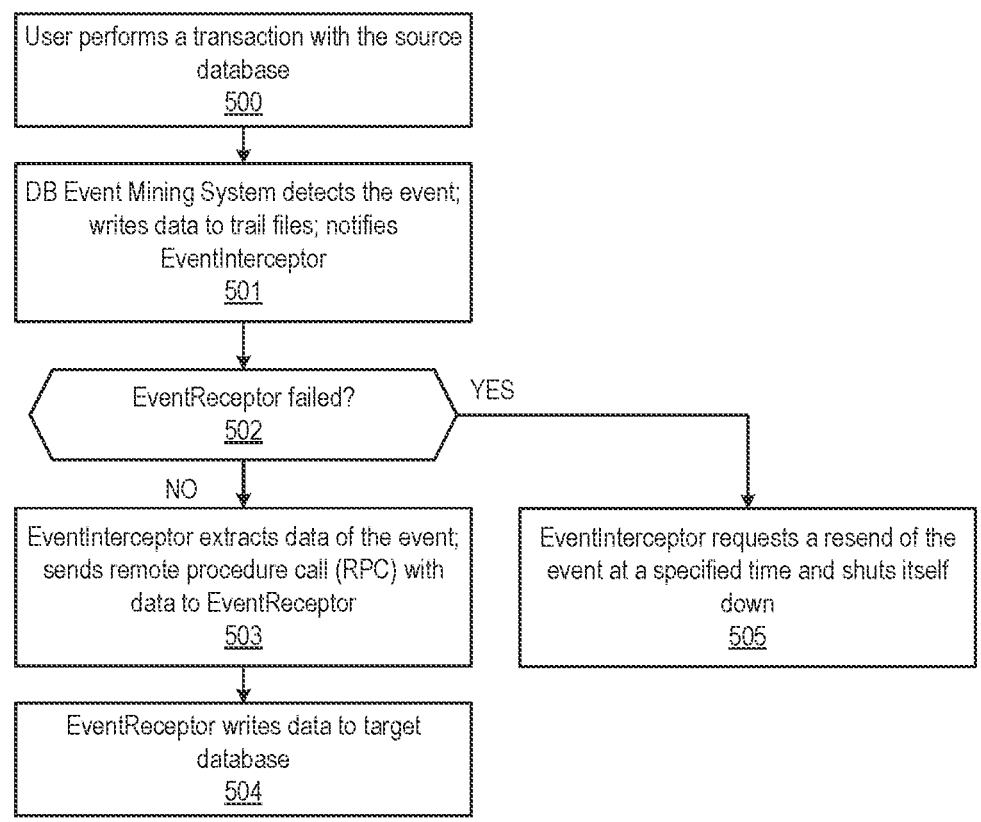
FIG. 5A is a flowchart illustrating a process for copying data in the computing system of FIG. 1, where a failure in the EventReceptor is detected, according to some example implementations.
Figure 5B:
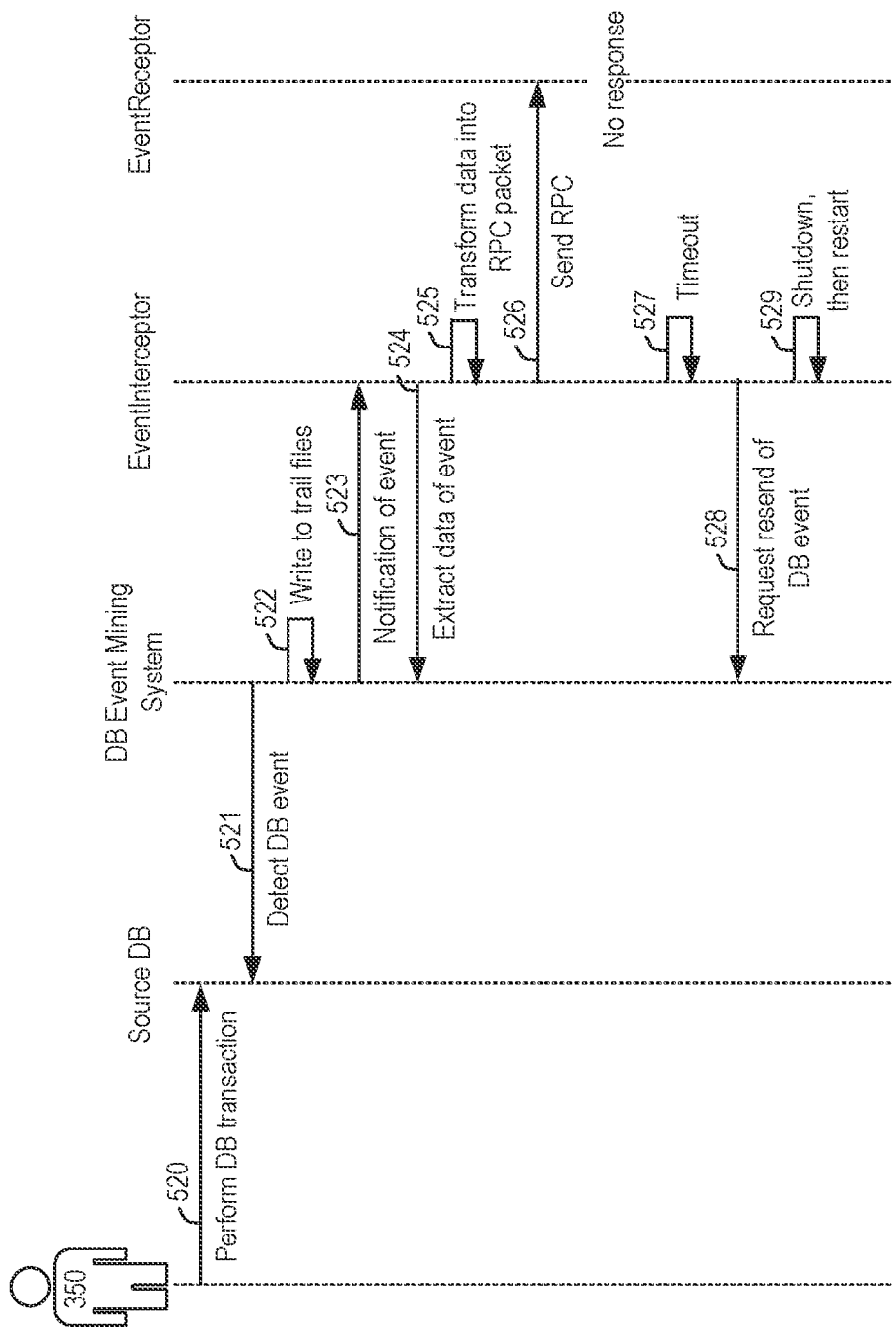
FIG. 5B is a sequence diagram consistent with FIG. 5A, when the EventReceptor process fails unexpectedly, according to some example implementations.
Figure 5C:
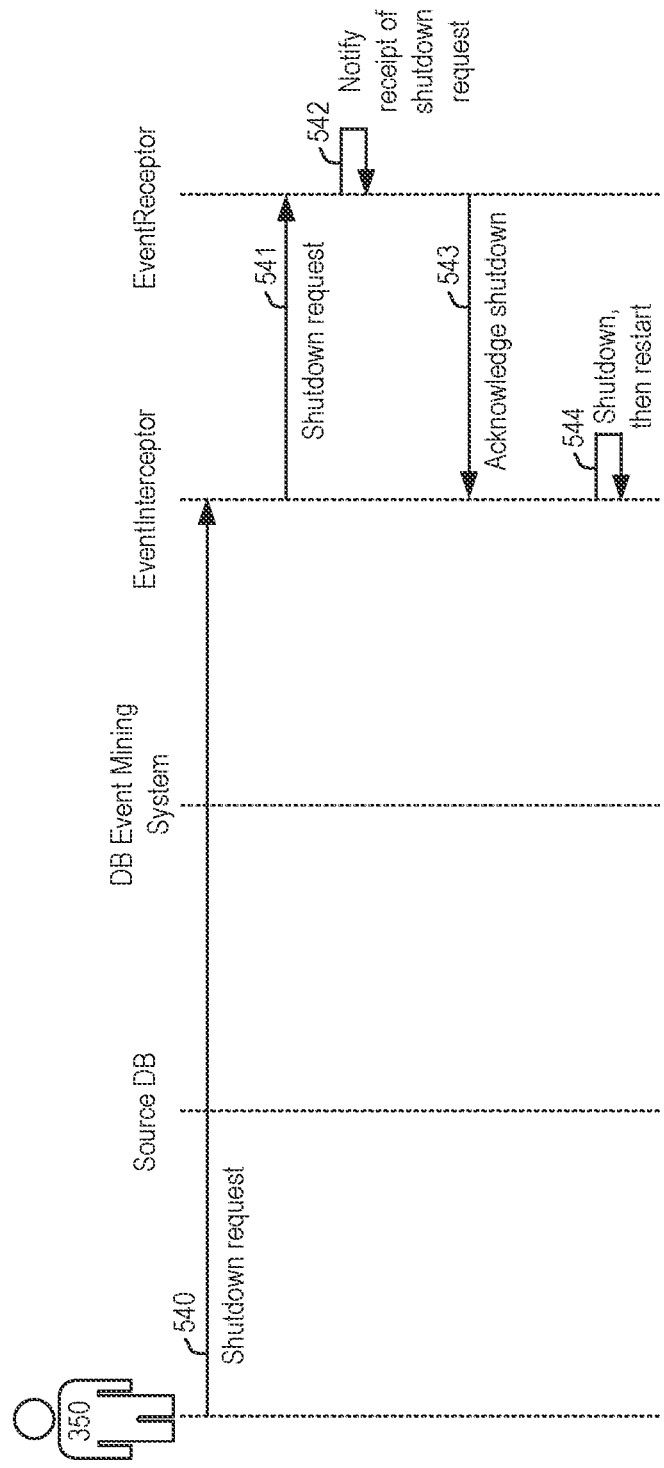
FIG. 5C is a sequence diagram in a scenario on which the EventReceptor undergoes a planned shutdown, according to some example implementations.
Figure 6A:
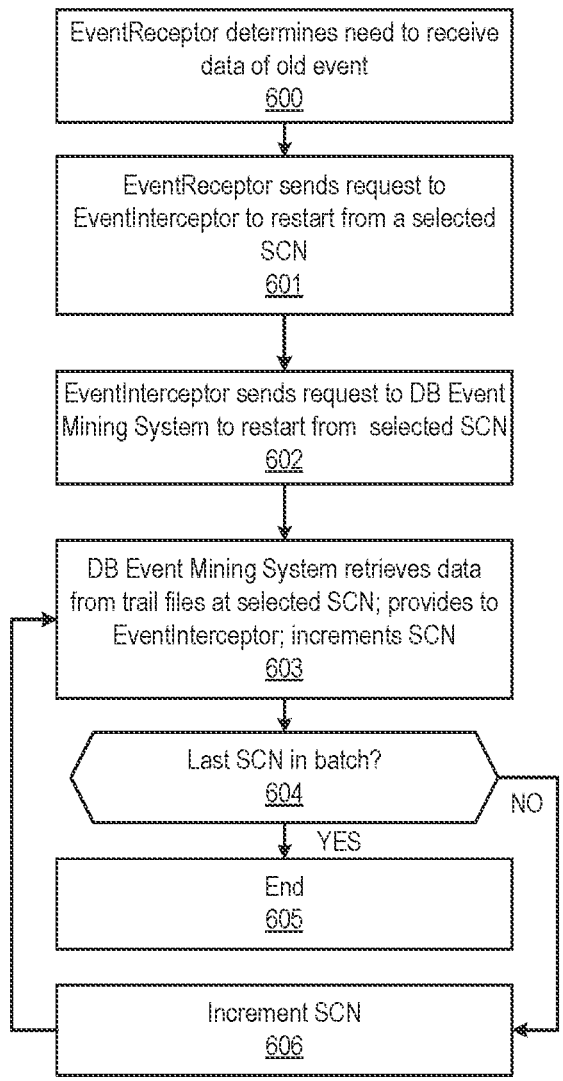
FIG. 6A is a flowchart illustrating a process for copying data in the computing system of FIG. 1, where the EventReceptor needs to receive data of an old event.
Figure 6B:
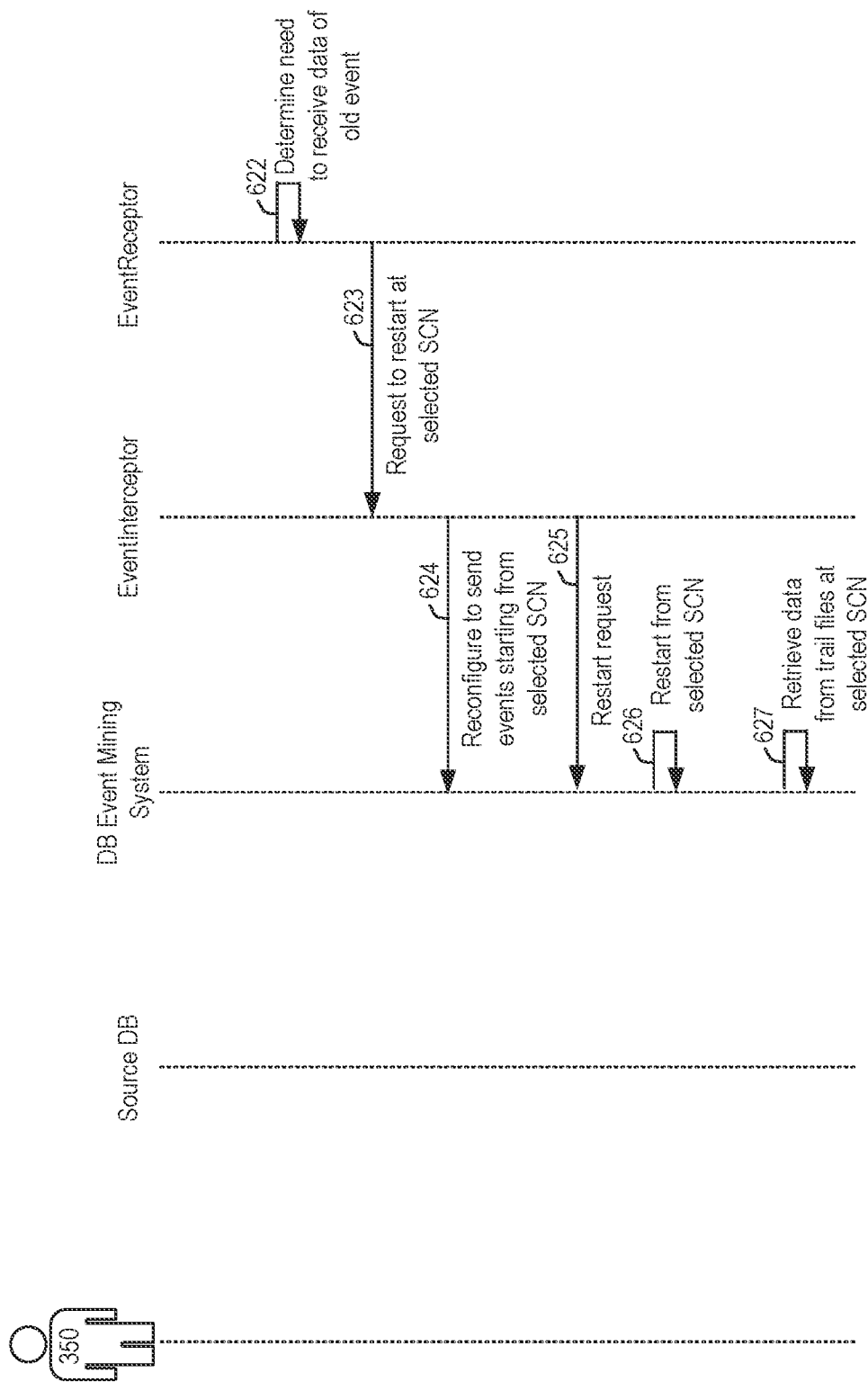
FIG. 6B is a first part of a sequence diagram consistent with FIG. 6A, according to some example implementations.

The techniques comprise three primary features: lazy data transmission (see FIGS. 4A and 4B), half-split brain (see FIGS. 5A to 5C), and point-in time play (see FIGS. 6A and 6B). These features enable the EventReceptor 140 to dictate that it only receives data when it is ready. It can also dictate a SCN at which it starts to receive data. The EventReceptor 140 also has the power to force the system to change its behavior when the EventReceptor 140 has a failure, and to accommodate the EventInterceptor 130 in such a way that no database event is lost and, hence, consistent replication is maintained.

The advantages of the techniques include a dynamic pairing process and the ability to go back in time, to obtain data from old events/transactions. Another advantage is ensuring data consistency even in the case of a component failure. Another advantage is there is no need to implement buffering logic inside the EventInterceptor 130 in case its partner, the EventReceptor 140, is down. As a result, there is no need for extra storage at the EventInterceptor 130. Instead, the techniques leverage the trail files 121 already being generated by the DB Event Mining System 120. By avoiding data duplication, extra storage capacity is not needed. This is particularly relevant in systems which charge the user based on the amount of storage used, in a "pay as you consume" model.

A further advantage is increased security by avoiding the duplication of data at the EventInterceptor 130. Instead, security measures can be applied to the trail files 121. As a result, there are fewer avenues of attack and the data migration is more secure.

A further advantage is that the ability to replay a set of DB events from a given SCN enables the EventReceptor 140 to recover any scenario where it has erred in writing database events to the target database 150. It effectively strengthens the replication eco-system to recover from various failure situations.

A further advantage is that not using persistent data inside the EventInterceptor 130 or the EventReceptor 140 makes them stateless applications. This simplifies deployment, management and scaling.

Figure 4A:
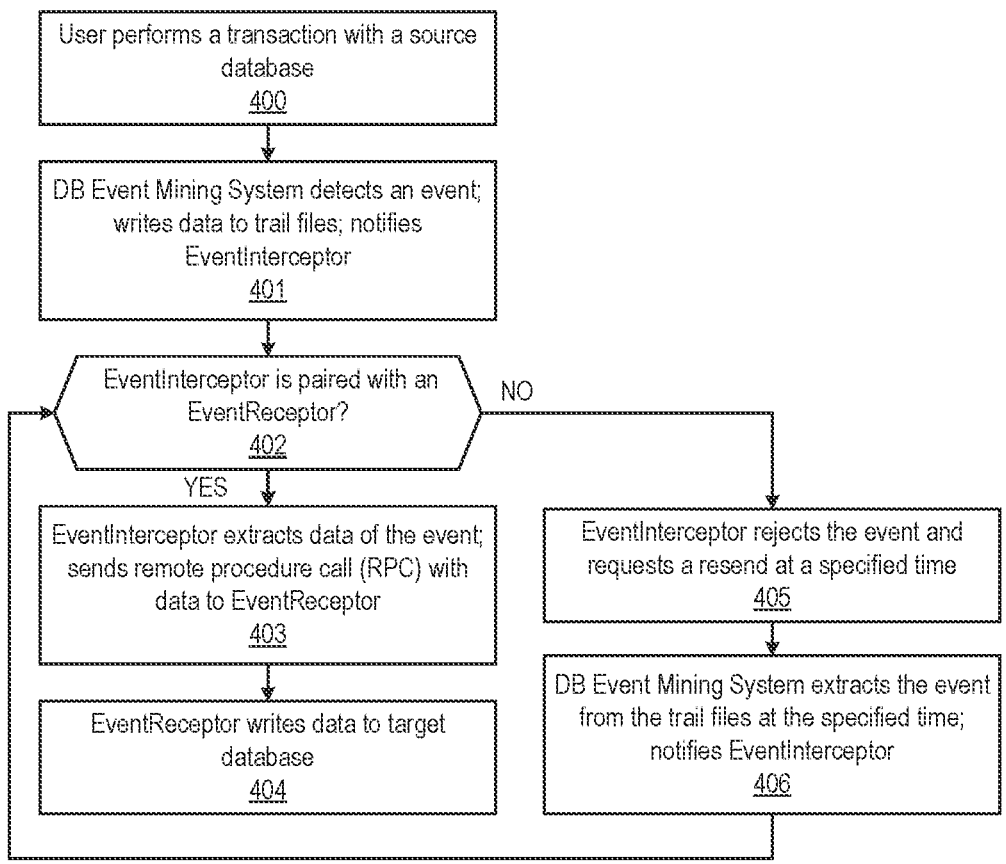
FIG. 4A is a flowchart illustrating a process for copying data in the computing system of FIG. 1, where the copying is delayed until the EventInterceptor is paired with the EventReceptor, according to some example implementations.

FIG. 4A is a flowchart illustrating a process for copying data in the computing system of FIG. 1, where the copying is delayed until the EventInterceptor 130 is paired with the EventReceptor 140, according to some example implementations. This process, referred to as lazy data transmission, can be used whenever the EventInterceptor 130 is online and running but the EventReceptor 140 is not. This situation may occur, e.g., when the EventInterceptor 130 boots up (is online) first, before the EventReceptor 140, in a day-zero situation. The EventInterceptor 130 process starts up and prepares to be paired with the EventReceptor 140. The pairing process can involve the EventInterceptor 130 and the EventReceptor 140 exchanging information such as security credentials indicating that they can trust each other.

If the EventInterceptor 130 is not yet paired, any database event generated by the user and detected by the DB Event Mining System 120 is ignored. Instead, the EventInterceptor 130 sends a denial or rejection message to the DB Event Mining System 120. This cycle can occur repeatedly. As the DB Event Mining System 120 keeps sending events to the EventInterceptor 130 and keeps getting rejections in turn, it essentially gets stuck and cannot make progress until the partner of the EventInterceptor 130, the EventReceptor 140, is ready. When the EventReceptor 140 is ready, it sends a pairing request to the EventInterceptor 130 and the two exchange information for pairing. Once the EventInterceptor 130 is paired, it starts accepting database events sent by the DB Event Mining System 120, extracting the associated data and sending it to the EventReceptor. This approach avoids the need for the EventInterceptor 130 to do caching or to concern itself with sending data to the EventReceptor when the EventReceptor is not ready.

In the flowchart, at step 400, the user performs a transaction with a source database 110. At step 401, the DB Event Mining System 120 detects an event associated with the transaction, writes data of the transaction to trail files 121 and notifies the EventInterceptor 130 of the event. A decision step 402 determines whether the EventInterceptor 130 is paired with the EventReceptor 140. If the answer is yes, step 403 is reached where the EventInterceptor 130 extracts data of the event and sends a remote procedure call (RPC) with the data to the EventReceptor 140. Subsequently, at step 404, the EventReceptor 140 writes the data to the target database 150.

If the answer to the decision step 402 is no, step 405 is reached where the EventInterceptor 130 rejects the event and requests a resend of the event at a specified time. This can be any time period such as second, minutes or hours. In this time period, the DB Event Mining System 120 and the EventInterceptor 130 are free to perform other tasks. For example, the EventInterceptor 130 can continue to listen for a potential pairing request from the EventReceptor 140 in case the EventReceptor 140 returns to an online status to pair with the EventInterceptor 130. As mentioned, there is no need for the EventInterceptor 130 to cache data and leverage the trail files 121. The DB Event Mining System 120 can continue to listen for database transactions and store the associated data in the trail files 121. In this approach, the synchronization of the event flow is directed by the EventReceptor 140 so the EventReceptor 140 can consume data whenever it wants.

At step 406, the DB Event Mining System 120 extracts the event from the trail files 121 at the specified time and notifies the EventInterceptor 130. The decision step 402 is then reached again to re-determine whether EventInterceptor 130 is paired with the EventReceptor 140. See FIG. 4B for further details.

Figure 4B:
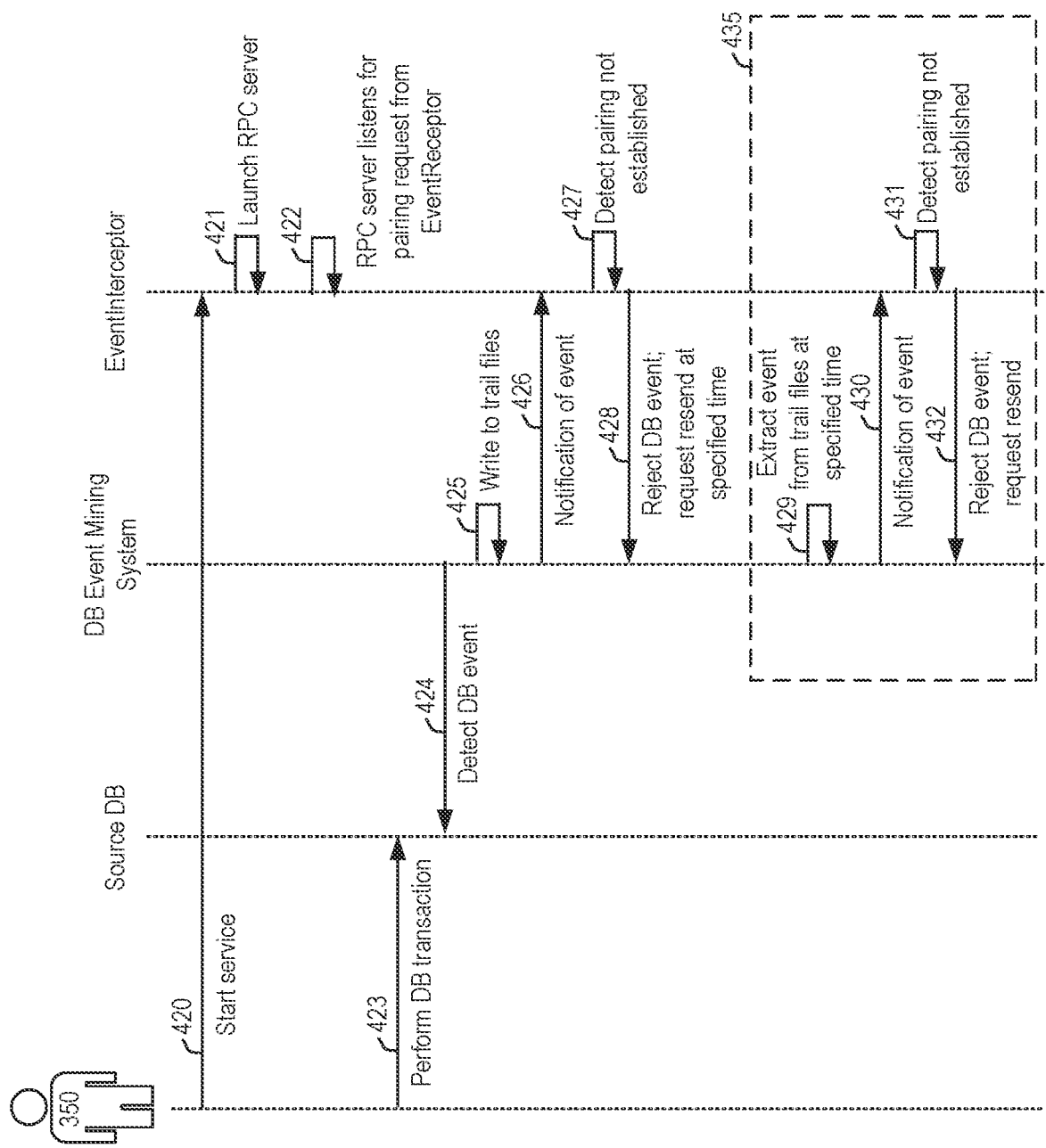
FIG. 4B is a sequence diagram consistent with FIG. 4A, according to some example implementations.

FIG. 4B is a sequence diagram consistent with FIG. 4A, according to some example implementations. An arrow 420 indicates the user communicates with the EventInterceptor 130 to start the service. An arrow 421 indicates the EventInterceptor 130 launches an RPC server process, e.g., using gRPC. An arrow 422 indicates the RPC server process listens for a pairing request from the EventReceptor 140. The RPC server process of the EventInterceptor 130 provides a set of external interfaces to the EventReceptor 140 which the EventReceptor 140 can use to send pairing requests when it wants to connect with the EventInterceptor 130, its downstream partner. As a pairing request is received at the EventInterceptor 130, coordinates are exchanged to know each other's endpoints and security context, leading to a successful pairing. Additionally, after the pairing is established, a heartbeat check process can be implemented in which the EventInterceptor 130 and EventReceptor 140 periodically send messages to each other to know whether a failure has occurred. For example, the EventInterceptor 130 can determine that the EventReceptor 140 has failed if it does not respond to messages from the EventInterceptor 130, and the EventReceptor 140 can determine that the EventInterceptor 130 has failed if it does not respond to messages from the EventReceptor 140.

In this example, assume the EventInterceptor 130 is not yet paired with the EventReceptor 140 when the database transaction begins. In this case, the EventReceptor 140 is not available to write data to the target database 150. An arrow 423 depicts the user performing a database transaction. An arrow 424 depicts the DB Event Mining System 120 detecting an associated database event. An arrow 425 depicts the DB Event Mining System 120 writing the data to trail files 121. An arrow 426 depicts the DB Event Mining System 120 notifying the EventInterceptor 130 of the event. An arrow 427 depicts the EventInterceptor 130 determining that it is not paired. An arrow 428 depicts the EventInterceptor 130 rejecting the event and requesting a resend of the event at a specified time.

A dashed box region 435 depicts a sequence of processes which may occur repeatedly while the EventInterceptor 130 remains unpaired. For example, an arrow 429 indicates the DB Event Mining System 120 extracts an event and its data from the trail files 121 at the specified time. An arrow 430 depicts a notification of the event to the EventInterceptor 130. The arrow 431 depicts the EventInterceptor 130 determining that it is still not paired. The arrow 432 depicts the EventInterceptor 130 rejecting the event and requesting a resend of the event at a specified time. At the specified time, e.g., after a specified delay, step 429 is repeated. If the EventInterceptor 130 determines that it is paired with the EventReceptor 140, the sequence of FIG. 3 can be followed.

FIG. 5A is a flowchart illustrating a process for copying data in the computing system of FIG. 1, where a failure in the EventReceptor 140 is detected, according to some example implementations. This process can be used when the EventReceptor 140 fails to process any event sent to it by the EventInterceptor 130. Such a failure can be caused by, e.g., a bug in the code run by the EventReceptor 140, the target database 150 being inaccessible to the EventReceptor 140 due to a network issue, or a user intentionally shutting down the EventReceptor 140 process. The EventInterceptor 130 can determine that the EventReceptor 140 process has stopped, e.g., when an ongoing RPC transaction has failed or no response is received to a heartbeat check signal for one or more times as is configured. The EventInterceptor 130 treats any of the above occurrences as an indication that the EventReceptor 140 is down.

On the other hand, if the EventInterceptor 130 is down, the DB Event Mining System 120 can determine this when the EventInterceptor 130 does not respond to events pushed to it. Instead, the DB Event Mining System 120 keeps storing data in trail files 121 regarding new transactions at the source database 110. As the EventInterceptor 130 comes online following a failure or a self-initiated shutdown, it returns to the sequence of FIG. 4B and waits until it can be paired to the EventReceptor 140. For a failed database event, e.g., an event which the DB Event Mining System 120 determines was rejected by the EventInterceptor 130, the DB Event Mining System 120 obtains the event and resends it to the EventInterceptor 130 as had been requested by the EventInterceptor 130. See, e.g., arrows 428 and 432 in FIG. 4B. This provides another chance to flow the same event from the DB Event Mining System 120 to the EventReceptor 140 via the Event Interceptor. With this approach, no database event is missed to ensure consistency between the source database 110 and the target database 150.

In the flowchart, at step 500, the user performs a transaction with the source database 110. At step 501, the DB Event Mining System 120 detects the event, writes corresponding data to the trail files 121, and notifies the EventInterceptor 130. A decision step 502 determines whether the EventReceptor 140 failed. If the answer is no, step 503 indicates the EventInterceptor 130 extracts data of the event, and sends a remote procedure call (RPC) with the data to the EventReceptor 140. At step 504, the EventReceptor 140 writes the data to the target database 150. If the answer to the decision step 502 is yes, at step 505, the EventInterceptor 130 requests a resend of the event at a specified time and shuts itself down. See the sequence diagrams of FIGS. 5B and 5C for further details.

At the start of the process, the EventInterceptor 130 and EventReceptor 140 are already paired. In this first pairing, the EventInterceptor 130 responded to a first pairing request from the EventReceptor 140 to pair the EventInterceptor 130 with the EventReceptor 140. When the EventInterceptor 130 determines that the EventReceptor 140 has failed, the EventInterceptor 130 shuts down for a period of time, then restarts. When the EventInterceptor 130 is restarted, it listens for a second pairing request from the event receptor. When the EventInterceptor 130 is restarted and the second pairing request is not received from the EventReceptor 140, the EventInterceptor 130 is to repeatedly receive and reject the event for the incomplete transaction from the DB Event Mining System 120. When the EventInterceptor 130 receives the second pairing request from the EventReceptor 140, the EventInterceptor 130 is to again pair itself with the EventReceptor 140.

FIG. 5B is a sequence diagram consistent with FIG. 5A, when the EventReceptor 140 process fails unexpectedly, according to some example implementations. An arrow 520 depicts a request of the user to perform a database (DB) transaction at the source database 110. A database event is detected by the DB Event Mining System 120 as depicted by the arrow 521. The arrow 522 depicts the DB Event Mining System 120 writing event data to trail files 121. The arrow 523 depicts a notification of the event being sent from the DB Event Mining System 120 to the EventInterceptor 130. In response, the arrow 524 depicts a request from the EventInterceptor 130 to the DB Event Mining System 120 to extract data of the event. An arrow 525 indicates the EventInterceptor 130 transforms the data into an RPC packet. The arrow 526 depicts sending the data in the RPC packets to the EventReceptor 140. However, no response is received by the EventInterceptor 130.

An arrow 527 indicates that a timeout occurs, leading the EventInterceptor 130 to determine that the EventReceptor 140 process is down. For example, this can be a synchronous call time out. It is assumed that the EventInterceptor 130 and EventReceptor 140 were previously paired. An arrow 528 indicates the EventInterceptor 130 requests a resend of the event. An arrow 529 indicates the EventInterceptor 130 shuts itself down for a specified period of time followed by a self-restart. In another implementation, the EventInterceptor 130 is manually restarted by a user.

FIG. 5C is a sequence diagram in a scenario on which the EventReceptor 140 undergoes a planned shutdown, according to some example implementations. The shutdown can be for maintenance reasons, for example. The arrow 540 depicts the user sending a shutdown request to the EventInterceptor 130. The arrow 541 depicts the EventInterceptor 130 forwarding the shutdown request to the EventReceptor 140. The arrow 542 depicts the EventReceptor 140 generating a notification of receipt of the shutdown request. The arrow 543 depicts the EventReceptor 140 sending an acknowledgment of the shutdown request to the EventInterceptor 130. The arrow 544 depicts the EventInterceptor 130 shutting itself down for a specified period of time, then restarting. This approach ensures that the EventInterceptor 130 does not shut down until it is confirmed that the EventReceptor 140 has received the shutdown request and will also shutdown.

As requested by the EventInterceptor 130, the DB Event Mining System 120 will resend the event after the specified delay for further processing. Additionally, as the EventInterceptor 130 is restarted, it can follow the process of FIG. 4B to give the EventReceptor 140 a chance to be repaired and come back online, ready to accept and process the same event it was processing when it failed.

FIG. 6A is a flowchart illustrating a process for copying data in the computing system of FIG. 1, where the EventReceptor 140 needs to receive data of an old event. There are various scenarios in which the EventReceptor 140 may want to replay past database events starting from a given SCN or other identifier. In one example scenario, the EventInterceptor 130 receives a batch of database events. The batch can include, e.g., a predetermined, specified number of events. Assume the batch includes 100 events starting at SCN=1,001 and ending at SCN=1,100, and that the EventReceptor 140 has received and written data for each event to the target database 150. Subsequently, the EventReceptor 140 performs a check of the written data, e.g., in a post-scan comparison of data in the source database 110 and the target database 150, and determines that an error occurred with the data associated with the $75^{th}$ event of the batch.

To avoid the need to resend the entire batch of data starting at SCN=1,001, the restart can begin instead at the selected errored event. The EventReceptor 140 will thus request that the EventInterceptor 130 restart from SCN=1,075 instead of SCN 1,001 to optimize performance. A process at the EventReceptor 140 can include: receiving data regarding each event of a plurality of events, e.g., a batch of 100 events, where each event of the plurality of events involves a transfer of data from a source database 110 to a target database 150, writing the data of each event of the plurality of events to the target database 150, after the writing, determining that an error exists with data of a selected event of the plurality of events, e.g., the event of SCN=1,075, and sending a request to resend data regarding a subset of the plurality of events starting with the selected event, where the request comprises an identifier, e.g., SCN, of the selected event. In this case, the EventReceptor 140 can ask the EventInterceptor 130 to replay starting from the specified SCN which represents a previous point in time. The EventReceptor 140 then receives data of the subset of the events identified by SCN=1,075 to 1,000. The EventInterceptor 130 forwards the request to the DB Event Mining System 120.

In the flowchart, at step 600, the EventReceptor 140 determines the need to receive data of an old event, e.g., an event which occurred earlier than the most recent event. For example, the EventReceptor 140 may find that it needs to re-write data from an event which was not written correctly to the target database 150. In another example, the EventReceptor 140 recognizes that a partial SQL write to the target database 150 was performed in a previous batch of transactions. In another example, the EventReceptor 140 needs to replay events since a time at which the target database 150 went down and does not want to start at the first transaction of the batch. The ability to rollback over a period of time leveraging the SCN provides a greater degree of control to the EventReceptor 140, to achieve consistency in writing data to the target database 150. It can also be used to verify data, comparing data in the target database 150 to what is received.

At step 601, the EventReceptor 140 sends a request to the EventInterceptor 130 to restart from a selected SCN. At step 602, the EventInterceptor 130 sends a corresponding request to the DB Event Mining System 120 to restart from the selected SCN. At step 603, the DB Event Mining System 120 retrieves data from trail files 121 at the selected SCN, provides the data to the EventInterceptor 130, and increments the SCN to the next transaction in the batch. A decision step 604 determines whether the SCN is the last SCN in the batch. If the answer is yes, the process ends at step 605. If the answer is no, step 606 increments SCN and step 603 follows. See the sequence diagram of FIG. 6B for further details.

FIG. 6B is a first part of a sequence diagram consistent with FIG. 6A, according to some example implementations. The arrow 622 depicts the EventReceptor 140 determining a need to receive data of an old event. The arrow 623 depicts the EventReceptor 140 sending a request to the EventInterceptor 130 to restart at a selected SCN. The arrow 624 depicts the EventInterceptor 130 sending a request to reconfigure the DB Event Mining System 120 to send events starting from the selected SCN. The arrow 625 depicts the EventInterceptor 130 sending a restart request to the DB Event Mining System 120. The arrow 626 depicts the DB Event Mining System 120 restarting from the selected SCN. The arrow 627 depicts the DB Event Mining System 120 retrieving data from the trail files 121 at a selected SCN. The process can be continued in a sequence such as depicted in FIG. 3.

Example Electronic Devices and Environments

Electronic Device and Machine-Readable Media

One or more parts of the above implementations may include software. Software is a general term whose meaning can range from part of the code and/or metadata of a single computer program to the entirety of multiple programs. A computer program (also referred to as a program) comprises code and optionally data. Code (sometimes referred to as computer program code or program code) comprises software instructions (also referred to as instructions). Instructions may be executed by hardware to perform operations. Executing software includes executing code, which includes executing instructions. The execution of a program to perform a task involves executing some or all of the instructions in that program.

An electronic device (also referred to as a device, computing device, computer, etc.) includes hardware and software. For example, an electronic device may include a set of one or more processors coupled to one or more machine-readable storage media (e.g., non-volatile memory such as magnetic disks, optical disks, read only memory (ROM), Flash memory, phase change memory, solid state drives (SSDs) to store code and optionally data. For instance, an electronic device may include non-volatile memory (with slower read/write times) and volatile memory (e.g., dynamic random-access memory (DRAM), static random-access memory (SRAM)). Non-volatile memory persists code/data even when the electronic device is turned off or when power is otherwise removed, and the electronic device copies that part of the code that is to be executed by the set of processors of that electronic device from the non-volatile memory into the volatile memory of that electronic device during operation because volatile memory typically has faster read/write times. As another example, an electronic device may include a non-volatile memory (e.g., phase change memory) that persists code/data when the electronic device has power removed, and that has sufficiently fast read/write times such that, rather than copying the part of the code to be executed into volatile memory, the code/data may be provided directly to the set of processors (e.g., loaded into a cache of the set of processors). In other words, this non-volatile memory operates as both long term storage and main memory, and thus the electronic device may have no or only a small amount of volatile memory for main memory.

In addition to storing code and/or data on machine-readable storage media, typical electronic devices can transmit and/or receive code and/or data over one or more machine-readable transmission media (also called a carrier) (e.g., electrical, optical, radio, acoustical or other forms of propagated signals—such as carrier waves, and/or infrared signals). For instance, typical electronic devices also include a set of one or more physical network interface(s) to establish network connections (to transmit and/or receive code and/or data using propagated signals) with other electronic devices. Thus, an electronic device may store and transmit (internally and/or with other electronic devices over a network) code and/or data with one or more machine-readable media (also referred to as computer-readable media).

Software instructions (also referred to as instructions) are capable of causing (also referred to as operable to cause and configurable to cause) a set of processors to perform operations when the instructions are executed by the set of processors. The phrase "capable of causing" (and synonyms mentioned above) includes various scenarios (or combinations thereof), such as instructions that are always executed versus instructions that may be executed. For example, instructions may be executed: 1) only in certain situations when the larger program is executed (e.g., a condition is fulfilled in the larger program; an event occurs such as a software or hardware interrupt, user input (e.g., a keystroke, a mouse-click, a voice command); a message is published, etc.); or 2) when the instructions are called by another program or part thereof (whether or not executed in the same or a different process, thread, lightweight thread, etc.). These scenarios may or may not require that a larger program, of which the instructions are a part, be currently configured to use those instructions (e.g., may or may not require that a user enables a feature, the feature or instructions be unlocked or enabled, the larger program is configured using data and the program's inherent functionality, etc.). As shown by these exemplary scenarios, "capable of causing" (and synonyms mentioned above) does not require "causing" but the mere capability to cause. While the term "instructions" may be used to refer to the instructions that when executed cause the performance of the operations described herein, the term may or may not also refer to other instructions that a program may include. Thus, instructions, code, program, and software are capable of causing operations when executed, whether the operations are always performed or sometimes performed (e.g., in the scenarios described previously). The phrase "the instructions when executed" refers to at least the instructions that when executed cause the performance of the operations described herein but may or may not refer to the execution of the other instructions.

Electronic devices are designed for and/or used for a variety of purposes, and different terms may reflect those purposes (e.g., user devices, network devices). Some user devices are designed to mainly be operated as servers (sometimes referred to as server devices), while others are designed to mainly be operated as clients (sometimes referred to as client devices, client computing devices, client computers, or end user devices; examples of which include desktops, workstations, laptops, personal digital assistants, smartphones, wearables, augmented reality (AR) devices, virtual reality (VR) devices, mixed reality (MR) devices, etc.). The software executed to operate a user device (typically a server device) as a server may be referred to as server software or server code), while the software executed to operate a user device (typically a client device) as a client may be referred to as client software or client code. A server provides one or more services (also referred to as serves) to one or more clients.

The term "user" refers to an entity (e.g., an individual person) that uses an electronic device. Software and/or services may use credentials to distinguish different accounts associated with the same and/or different users. Users can have one or more roles, such as administrator, programmer/developer, and end user roles. As an administrator, a user typically uses electronic devices to administer them for other users, and thus an administrator often works directly and/or indirectly with server devices and client devices.

FIG. 7 is a block diagram illustrating an electronic device 700 according to some example implementations. One or more of such electronic devices can host the processes and components depicted in FIG. 1.

FIG. 7 includes hardware 720 comprising a set of one or more processor(s) 722, a set of one or more network interfaces 724 (wireless and/or wired), and machine-readable media 726 having stored therein software 728 (which includes instructions executable by the set of one or more processor(s) 722). The machine-readable media 726 may include non-transitory and/or transitory machine-readable media. Each of the previously described clients and the database replication service may be implemented in one or more electronic devices 700. In one implementation: 1) each of the clients is implemented in a separate one of the electronic devices 700 (e.g., in end user devices where the software 728 represents the software to implement clients to interface directly and/or indirectly with the database replication service (e.g., software 728 represents a web browser, a native client, a portal, a command-line interface, and/or an application programming interface (API) based upon protocols such as Simple Object Access Protocol (SOAP), Representational State Transfer (REST), etc.)); 2) the database replication service is implemented in a separate set of one or more of the electronic devices 700 (e.g., a set of one or more server devices where the software 728 represents the software to implement the database replication service); and 3) in operation, the electronic devices implementing the clients and the database replication service would be communicatively coupled (e.g., by a network) and would establish between them (or through one or more other layers and/or or other services) connections for submitting requests to the database replication service and returning response to the clients. Other configurations of electronic devices may be used in other implementations (e.g., an implementation in which the client and the database replication service are implemented on a single one of electronic device 700).

In one possible approach, the processes of the database replication service act both as clients and servers. For example, the EventInterceptor 130 may act as a server to the DB Event Mining System 120, which acts as a client, and the EventReceptor 140 may act as a server to the EventInterceptor 130 process, which acts as a client.

During operation, an instance of the software 728 (illustrated as instance 706 and referred to as a software instance; and in the more specific case of an application, as an application instance) is executed. In electronic devices that use compute virtualization, the set of one or more processor(s) 722 typically execute software to instantiate a virtualization layer 708 and one or more software container(s) 704A-704R (e.g., with operating system-level virtualization, the virtualization layer 708 may represent a container engine (such as Docker Engine by Docker, Inc. or rkt in Container Linux by Red Hat, Inc.) running on top of (or integrated into) an operating system, and it allows for the creation of multiple software containers 704A-704R (representing separate user space instances and also called virtualization engines, virtual private servers, or jails) that may each be used to execute a set of one or more applications; with full virtualization, the virtualization layer 708 represents a hypervisor (sometimes referred to as a virtual machine monitor (VMM)) or a hypervisor executing on top of a host operating system, and the software containers 704A-704R each represent a tightly isolated form of a software container called a virtual machine that is run by the hypervisor and may include a guest operating system; with para-virtualization, an operating system and/or application running with a virtual machine may be aware of the presence of virtualization for optimization purposes). Again, in electronic devices where compute virtualization is used, during operation, an instance of the software 728 is executed within the software container 704A on the virtualization layer 708. In electronic devices where compute virtualization is not used, the instance 706 on top of a host operating system is executed on the "bare metal" electronic device 700. The instantiation of the instance 706, as well as the virtualization layer 708 and software containers 704A-704R if implemented, are collectively referred to as software instance(s) 702.

Alternative implementations of an electronic device may have numerous variations from that described above. For example, customized hardware and/or accelerators might also be used in an electronic device.

Example Environment

FIG. 8 is a block diagram of a deployment environment according to some example implementations. A system 740 includes hardware (e.g., a set of one or more server devices) and software to provide service(s) 742, including the database replication service. In some implementations the system 740 is in one or more datacenter(s). These datacenter(s) may be: 1) first party datacenter(s), which are datacenter(s) owned and/or operated by the same entity that provides and/or operates some or all of the software that provides the service(s) 742; and/or 2) third-party datacenter(s), which are datacenter(s) owned and/or operated by one or more different entities than the entity that provides the service(s) 742 (e.g., the different entities may host some or all of the software provided and/or operated by the entity that provides the service(s) 742). For example, third-party datacenters may be owned and/or operated by entities providing public cloud services (e.g., Amazon.com, Inc. (Amazon Web Services), Google LLC (Google Cloud Platform), Microsoft Corporation (Azure)).

The system 740 is coupled to user devices 780A-780S over a network 782. The service(s) 742 may be on-demand services that are made available to one or more of the users 784A-784S working for one or more entities other than the entity which owns and/or operates the on-demand services (those users sometimes referred to as outside users) so that those entities need not be concerned with building and/or maintaining a system, but instead may make use of the service(s) 742 when needed (e.g., when needed by the users 784A-784S). The service(s) 742 may communicate with each other and/or with one or more of the user devices 780A-780S via one or more APIs (e.g., a REST API). In some implementations, the user devices 780A-780S are operated by users 784A-784S, and each may be operated as a client device and/or a server device. In some implementations, one or more of the user devices 780A-780S are separate ones of the electronic device 700 or include one or more features of the electronic device 700.

In some implementations, the system 740 is a multi-tenant system (also known as a multi-tenant architecture). The term multi-tenant system refers to a system in which various elements of hardware and/or software of the system may be shared by one or more tenants. A multi-tenant system may be operated by a first entity (sometimes referred to a multi-tenant system provider, operator, or vendor; or simply a provider, operator, or vendor) that provides one or more services to the tenants (in which case the tenants are customers of the operator and sometimes referred to as operator customers). A tenant includes a group of users who share a common access with specific privileges. The tenants may be different entities (e.g., different companies, different departments/divisions of a company, and/or other types of entities), and some or all of these entities may be vendors that sell or otherwise provide products and/or services to their customers (sometimes referred to as tenant customers). A multi-tenant system may allow each tenant to input tenant specific data for user management, tenant-specific functionality, configuration, customizations, non-functional properties, associated applications, etc. A tenant may have one or more roles relative to a system and/or service. For example, in the context of a customer relationship management (CRM) system or service, a tenant may be a vendor using the CRM system or service to manage information the tenant has regarding one or more customers of the vendor. As another example, in the context of Data as a Service (DAAS), one set of tenants may be vendors providing data and another set of tenants may be customers of different ones or all of the vendors' data. As another example, in the context of Platform as a Service (PAAS), one set of tenants may be third-party application developers providing applications/services and another set of tenants may be customers of different ones or all of the third-party application developers.

Multi-tenancy can be implemented in different ways. In some implementations, a multi-tenant architecture may include a single software instance (e.g., a single database instance) which is shared by multiple tenants; other implementations may include a single software instance (e.g., database instance) per tenant; yet other implementations may include a mixed model; e.g., a single software instance (e.g., an application instance) per tenant and another software instance (e.g., database instance) shared by multiple tenants.

In one implementation, the system 740 is a multi-tenant cloud computing architecture supporting multiple services, such as one or more of the following types of services: database replication service (see the system 100 in FIG. 1); Customer relationship management (CRM); Configure, price, quote (CPQ); Business process modeling (BPM); Customer support; Marketing; External data connectivity; Productivity; Database-as-a-Service; Data-as-a-Service (DAAS or DaaS); Platform-as-a-service (PAAS or PaaS); Infrastructure-as-a-Service (IAAS or IaaS) (e.g., virtual machines, servers, and/or storage); Analytics; Community; Internet-of-Things (IoT); Industry-specific; Artificial intelligence (AI); Application marketplace ("app store"); Data modeling; Security; and Identity and access management (IAM).

For example, system 740 may include an application platform 744 that enables PAAS for creating, managing, and executing one or more applications developed by the provider of the application platform 744, users accessing the system 740 via one or more of user devices 780A-780S, or third-party application developers accessing the system 740 via one or more of user devices 780A-780S.

In some implementations, one or more of the service(s) 742 may use one or more multi-tenant databases 746, as well as system data storage 750 for system data 752 accessible to system 740. In certain implementations, the system 740 includes a set of one or more servers that are running on server electronic devices and that are configured to handle requests for any authorized user associated with any tenant (there is no server affinity for a user and/or tenant to a specific server). The user devices 780A-780S communicate with the server(s) of system 740 to request and update tenant-level data and system-level data hosted by system 740, and in response the system 740 (e.g., one or more servers in system 740) automatically may generate one or more Structured Query Language (SQL) statements (e.g., one or more SQL queries) that are designed to access the desired information from the multi-tenant database(s) 746 and/or system data storage 750.

In some implementations, the service(s) 742 are implemented using virtual applications dynamically created at run time responsive to queries from the user devices 780A-780S and in accordance with metadata, including: 1) metadata that describes constructs (e.g., forms, reports, workflows, user access privileges, business logic) that are common to multiple tenants; and/or 2) metadata that is tenant specific and describes tenant specific constructs (e.g., tables, reports, dashboards, interfaces, etc.) and is stored in a multi-tenant database. To that end, the program code 760 may be a runtime engine that materializes application data from the metadata; that is, there is a clear separation of the compiled runtime engine (also known as the system kernel), tenant data, and the metadata, which makes it possible to independently update the system kernel and tenant-specific applications and schemas, with virtually no risk of one affecting the others. Further, in one implementation, the application platform 744 includes an application setup mechanism that supports application developers' creation and management of applications, which may be saved as metadata by save routines. Invocations to such applications, including the database replication service, may be coded using Procedural Language/Structured Object Query Language (PL/SOQL) that provides a programming language style interface. Invocations to applications may be detected by one or more system processes, which manages retrieving application metadata for the tenant making the invocation and executing the metadata as an application in a software container (e.g., a virtual machine).

Network 782 may be any one or any combination of a LAN (local area network), WAN (wide area network), telephone network, wireless network, point-to-point network, star network, token ring network, hub network, or other appropriate configuration. The network may comply with one or more network protocols, including an Institute of Electrical and Electronics Engineers (IEEE) protocol, a 3rd Generation Partnership Project (3GPP) protocol, a 4th generation wireless protocol (4G) (e.g., the Long Term Evolution (LTE) standard, LTE Advanced, LTE Advanced Pro), a fifth generation wireless protocol (5G), and/or similar wired and/or wireless protocols, and may include one or more intermediary devices for routing data between the system 740 and the user devices 780A-780S.

Each user device 780A-780S (such as a desktop personal computer, workstation, laptop, Personal Digital Assistant (PDA), smartphone, smartwatch, wearable device, augmented reality (AR) device, virtual reality (VR) device, etc.) typically includes one or more user interface devices, such as a keyboard, a mouse, a trackball, a touch pad, a touch screen, a pen or the like, video or touch free user interfaces, for interacting with a graphical user interface (GUI) provided on a display (e.g., a monitor screen, a liquid crystal display (LCD), a head-up display, a head-mounted display, etc.) in conjunction with pages, forms, applications and other information provided by system 740. For example, the user interface device can be used to access data and applications hosted by system 740, and to perform searches on stored data, and otherwise allow one or more of users 784A-784S to interact with various GUI pages that may be presented to the one or more of users 784A-784S. User devices 780A-780S might communicate with system 740 using TCP/IP (Transfer Control Protocol and Internet Protocol) and, at a higher network level, use other networking protocols to communicate, such as Hypertext Transfer Protocol (HTTP), File Transfer Protocol (FTP), Andrew File System (AFS), Wireless Application Protocol (WAP), Network File System (NFS), an application program interface (API) based upon protocols such as Simple Object Access Protocol (SOAP), Representational State Transfer (REST), etc. In an example where HTTP is used, one or more user devices 780A-780S might include an HTTP client, commonly referred to as a "browser," for sending and receiving HTTP messages to and from server(s) of system 740, thus allowing users 784A-784S of the user devices 780A-780S to access, process and view information, pages and applications available to it from system 740 over network 782.

Conclusion

In the above description, numerous specific details such as resource partitioning/sharing/duplication implementations, types and interrelationships of system components, and logic partitioning/integration choices are set forth in order to provide a more thorough understanding. The invention may be practiced without such specific details, however. In other instances, control structures, logic implementations, opcodes, means to specify operands, and full software instruction sequences have not been shown in detail since those of ordinary skill in the art, with the included descriptions, will be able to implement what is described without undue experimentation.

References in the specification to "one implementation," "an implementation," "an example implementation," etc., indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, and/or characteristic is described in connection with an implementation, one skilled in the art would know to affect such feature, structure, and/or characteristic in connection with other implementations whether or not explicitly described.

For example, the figure(s) illustrating flow diagrams sometimes refer to the figure(s) illustrating block diagrams, and vice versa. Whether or not explicitly described, the alternative implementations discussed with reference to the figure(s) illustrating block diagrams also apply to the implementations discussed with reference to the figure(s) illustrating flow diagrams, and vice versa. At the same time, the scope of this description includes implementations, other than those discussed with reference to the block diagrams, for performing the flow diagrams, and vice versa.

Bracketed text and blocks with dashed borders (e.g., large dashes, small dashes, dot-dash, and dots) may be used herein to illustrate optional operations and/or structures that add additional features to some implementations. However, such notation should not be taken to mean that these are the only options or optional operations, and/or that blocks with solid borders are not optional in certain implementations.

The detailed description and claims may use the term "coupled," along with its derivatives. "Coupled" is used to indicate that two or more elements, which may or may not be in direct physical or electrical contact with each other, co-operate or interact with each other.

While the flow diagrams in the figures show a particular order of operations performed by certain implementations, such order is exemplary and not limiting (e.g., alternative implementations may perform the operations in a different order, combine certain operations, perform certain operations in parallel, overlap performance of certain operations such that they are partially in parallel, etc.).

While the above description includes several example implementations, the invention is not limited to the implementations described and can be practiced with modification and alteration within the spirit and scope of the appended claims. The description is thus illustrative instead of limiting.

What is claimed is:

1. An apparatus comprising:
   one or more processors; and
   a non-transitory machine-readable storage medium having program instructions stored thereon that are executable by the one or more processors to cause the apparatus to implement an event interceptor that performs operations comprising:
      responding to a first pairing request from an event receptor to pair with the event receptor to establish a connection, wherein the event receptor is operable to write data to a target database based on changes made at a source database, and wherein the connection permits the event interceptor to provide event data to the event receptor;
      while paired with the event receptor, receiving, from an event system, events regarding particular changes made at the source database, extracting data of the events and sending the extracted data to the event receptor to implement the particular changes at the target database;
      determining that the event receptor has failed and become unreceptive to receiving event data;
      in response to the determining that the event receptor has failed, shutting down for a period of time before restarting; and
      after the restarting, rejecting received events from the event system until at least a second pairing request is received from the event receptor to reestablish the connection, wherein the second pairing request is indicative that the event receptor has recovered.

2. The apparatus of claim 1, wherein the operations further comprise:
   before the shutting down and after the determining that the event receptor has failed, sending a message to the event system to resend an event for an incomplete transaction.

3. The apparatus of claim 2, wherein the event system is operable to buffer events which occur while the event interceptor is shut down and while the event interceptor has not yet received the second pairing request from the event receptor after the restarting.

4. The apparatus of claim 2, wherein the operations further comprise:
   responding to the second pairing request from the event receptor to reestablish the connection; and
   while paired with the event receptor after the restarting, receiving the event regarding the incomplete transaction from the event system, extracting data of the event regarding the incomplete transaction, and sending the extracted data of the event regarding the incomplete transaction to the event receptor.

5. The apparatus of claim 2, wherein the operations further comprise, while the event interceptor has not yet received the second pairing request from the event receptor after the restarting, repeatedly receiving and rejecting the event for the incomplete transaction from the database event mining system.

6. The apparatus of claim 5, wherein the receiving and rejecting is performed without buffering the event for the incomplete transaction.

7. The apparatus of claim 1, wherein the determining includes periodically performing a heartbeat check of the event receptor.

8. The apparatus of claim 1, wherein the determining is based on a determination that an ongoing transaction with the event receptor has failed.

9. The apparatus of claim 1, wherein the operations further comprise:
   launching a remote procedure call server to listen for the second pairing request from the event receptor.

10. The apparatus of claim 1, wherein the extracted data is sent to the event receptor via a remote procedure call.

11. A non-transitory machine-readable storage medium having program instructions stored thereon that are executable by one or more processors to implement an event interceptor that performs operations comprising:
   determining whether the event interceptor is paired with an event receptor via a connection, wherein the event receptor is operable to write data to a target database based on changes made at a source database, and wherein the connection permits the event interceptor to provide event data to the event receptor;
   in response to a determination that the event interceptor is not paired with the event receptor, rejecting events regarding changes made at the source database;
   in response to a determination that the event interceptor is paired with the event receptor, extracting data from events regarding particular changes made at the source database and sending the extracted data to the event receptor to implement the particular changes at the target database;

in response to a determination that the event receptor has failed and become unreceptive to receiving event data, shutting down for a period of time before restarting; and after the restarting, rejecting received events from an event system until at least a pairing request is received from the event receptor to reestablish the connection, wherein the pairing request is indicative that the event receptor has recovered.

12. The non-transitory machine-readable storage medium of claim 11, wherein the rejecting is performed without buffering the events.

13. The non-transitory machine-readable storage medium of claim 11, wherein the operations further comprise:

launching a remote procedure call to listen for the pairing request from the event receptor; and when the pairing request is detected, exchanging information with the event receptor to pair with the event receptor.

14. The non-transitory machine-readable storage medium of claim 11, wherein the extracted data is sent to the event receptor via a remote procedure call.

15. A method, comprising:

responding, by an event interceptor executing on a computer system, to a first pairing request from an event receptor to pair to establish a connection, wherein the event receptor is operable to write data to a target database based on changes made at a source database, and wherein the connection permits the event interceptor to provide event data to the event receptor for writing to the target database;

receiving, from an event system by the event interceptor, data regarding each event of a batch of events, wherein each event of the batch of events involves a transfer of data from the source database to the target database;

sending, by the event interceptor, the data of each event of the batch of events to the event receptor to implement particular changes at the target database;

determining, by the event interceptor, that the event receptor has failed and become unreceptive to receiving event data;

in response to the determining that the event receptor has failed, the event interceptor shutting down for a period of time before restarting; and after the restarting, the event interceptor rejecting received events from the event system until at least a second pairing request is received from the event receptor to reestablish the connection, wherein the second pairing request is indicative that the event receptor has recovered.

16. The method of claim 15, further comprising:

after the sending, receiving a request to resend data regarding a subset of the batch of events starting with a selected event, wherein the request to resend the data comprises an identifier of the selected event, wherein each event of the batch of events is associated with a respective system change number (SCN), and wherein the identifier of the selected event comprises an SCN associated with the selected event.

17. The method of claim 16, further comprising:

sending, by the event interceptor, the identifier of the selected event to the event system; and receiving, by the event interceptor, the data regarding the subset of the batch of events.

18. The method of claim 15, wherein the data of each event of the batch of events is sent to the event receptor via a remote procedure call.

* * * * *